United States Patent
Klindworth

(10) Patent No.: US 7,303,499 B2
(45) Date of Patent: Dec. 4, 2007

(54) DISPLACING DEVICE

(76) Inventor: Jan Klindworth, Seestrasse 3b, Murmau (DE) 82418

(*) Notice: Subject to any disclaimer, the term of this patent is extended or adjusted under 35 U.S.C. 154(b) by 412 days.

(21) Appl. No.: 10/530,803

(22) PCT Filed: Oct. 7, 2003

(86) PCT No.: PCT/EP03/11082

§ 371 (c)(1), (2), (4) Date: Apr. 8, 2005

(87) PCT Pub. No.: WO2004/035996

PCT Pub. Date: Apr. 29, 2004

(65) Prior Publication Data

US 2005/0280303 A1    Dec. 22, 2005

(30) Foreign Application Priority Data

Oct. 10, 2002 (DE) ............................ 102 47 204

(51) Int. Cl.
 *F16H 1/32* (2006.01)
 *B60N 2/02* (2006.01)
(52) U.S. Cl. ............... 475/176; 475/180; 297/367
(58) Field of Classification Search ........... 475/162, 475/163, 164, 169, 170, 176, 177, 180; 297/366, 297/367, 368, 369; 192/41 R, 42, 43, 43.1, 192/43.2, 45.1, 41 A
See application file for complete search history.

(56) References Cited

U.S. PATENT DOCUMENTS

| | | | |
|---|---|---|---|
| 3,258,994 A * | 7/1966 | Gorfin | 475/163 |
| 3,534,636 A * | 10/1970 | Lorence | 475/177 |
| 4,604,916 A * | 8/1986 | Distin, Jr. | 475/168 |
| 5,643,128 A | 7/1997 | Kennedy | |
| 5,681,086 A * | 10/1997 | Baloche | 297/367 |
| 5,718,480 A | 2/1998 | Schüler et al. | |

FOREIGN PATENT DOCUMENTS

| | | |
|---|---|---|
| DE | 101 26 823 | 2/2002 |
| DE | 195 08 328 | 10/2002 |
| EP | 0 211 687 | 2/1987 |
| GB | 177716 | 4/1922 |

* cited by examiner

*Primary Examiner*—Roger Pang
(74) *Attorney, Agent, or Firm*—Volpe and Koenig, PC

(57) ABSTRACT

A device for adjusting two parts (2, 3) relative to one another, other than for a displacing device which is provided displacing a camshaft. The adjusting device is smooth and easy to operate, is self-locking, and ensures a backlash-free, continuous displacement of the two parts with a high degree of efficiency. The device includes a first part (2) having webs (2.3, 22.3) which are spaced apart in the circumferential direction and between which chambers (2.4) are provided, a second part (3) having an internal toothing (3.2, 13.2), and several teeth (7, 27) that are disposed at a distance from each other in the circumferential direction within the chambers and have an inner contact area (7.4) for resting against an eccentric drive member (6) as well as an outer contact area (7.5) for engagement with the internal toothing (3.2, 13.2). Rotary movements can be performed by the teeth (7, 27) located within the chambers (2.4) about axes of rotation that extend parallel to the axis of rotation (A) of the parts (2, 3) when an input shaft is rotated.

24 Claims, 12 Drawing Sheets a)

b)

c)

d)

DISPLACING DEVICE

BACKGROUND

The invention relates to an adjusting device for adjusting two components. Such adjusting devices are amongst other things used for adjusting of round parts and as reduction gear unit.

Amongst other things, stepper motors, which enable self-locking and an exact, but merely discrete, i.e. non-continuous adjustment, can be used as adjusting devices. Furthermore, for achieving self-locking and a high gear reduction, a worm gear pair can be used. However, for a relatively large amount of friction, worm gear pairs exhibit low efficiency and require materials that are resistant to wear and heat.

DE 195 08 328 A1 presents a self-locking adjusting device for rotating two bracing parts relative to each other. One of the two bracing parts comprises internal gearing, into which locking bars or teeth can be inserted in a straight-line radial direction. The teeth are guided in chambers between webs of the other bracing part, such that the radially inwards and outwards movement is precisely enabled. The teeth are supported inwards on a control surface, which is formed as an outer surface of an egg-shaped control element. When the control element rotates, the teeth are thus periodically pushed outwards in the radial direction, wherein a few of the teeth engage in the teeth gaps. The outer end sections of the teeth and the recesses or teeth gaps of the internal gearing taper outwards, so that the teeth transfer torque between the webs of the second bracing part and the internal gearing of the first bracing part for eccentric insertion into a recess.

However, a disadvantage in this adjusting device is first that only partial self-locking is achieved. When torque acts upon the bracing part with internal gearing, only the one or two teeth, which are pressed against the eccentric region of the control element by the teeth of the internal gearing, contribute to the self-locking effect, depending on he engagement situation of the teeth. The opposing teeth likewise contribute minimally to the self-locking, like those teeth, which are in the radially outer position, i.e., positive-fit in the recess, and those teeth, which are in the radially inner position, i.e., not engaged in the teeth gaps of the internal gearing. However, the possibly only one tooth, which is to contribute to the self-locking effect, can transfer a force not directed towards the rotational axis from the internal gearing to the control element between the point of application of the internal gearing at its outer contact surface and its inner contact surface contacting the control element, which thus leads to transmission of torque. In this way, especially for the use of only a few teeth, no positive-fit connection between the internal gearing and the webs and thus, at least for an unfavorable engagement situation of the teeth, also no complete self-locking can be achieved.

Furthermore, a play-free configuration of such an adjusting device is problematic. The teeth that can move linearly in the radial direction slide with their side surfaces on the side surfaces of the webs of the second bracing part. However, a play-free arrangement of the teeth between the webs is practically impossible; for achieving a low-friction guidance of the teeth between the webs, a certain overdimension is necessary. Finally, due to the manufacturing-specific tolerances, play between the control surface and the tooth remains even in the positive-fit engagement of a tooth in its radially outer position in a recess of the internal gearing.

SUMMARY

The invention is based on the objective of providing an adjusting device, which ensures self-locking and at least essentially play-free, continuous adjustment of two parts for simple and smooth-running operability. Advantageously, a high gear reduction should be achievable.

According to the invention, the teeth thus execute rotational movements during the adjusting movement. These movement of the teeth in general can be superimposed movements of a linear movement directed outwardly and inwardly in the radial direction and a rotational movement of the teeth about a rotational axis parallel to the rotational axis of the parts. In an especially preferred way, the teeth each run on a circular arc path from their inner contact with the drive element to the outer contact with the internal gearing and back on another circular arc path.

The rotational movements of the teeth according to the invention permits a good adaption of the shape of the teeth and webs, as well as the internal gearing, to the course of movement, which enables a self-locking engagement of a part of the teeth. In this way, in particular, a more favorable transfer angle between the moving tooth and the internal gearing is achieved, in which the force transfer from the moving tooth to the internal gearing is realized with a small radial part, so that a higher efficiency can be achieved. Furthermore, in particular a defined contact of a tooth to the two adjacent webs is enabled, which leads to a reduction of play.

Advantageously, in this way, in the outermost radial position of a tooth, there is no contact with the internal gearing in order to guarantee a defined contact with the adjacent webs also in the position. The coupling of the teeth to the internal gearing is thus realized at the preferably oblique tooth faces, wherein at least one tooth contacts a front or back tooth face in the rotational direction.

An eccentric is preferably provided as a drive element for adjusting the teeth. For this purpose, an eccentrically mounted circular disk is mounted directly on the input shaft. The teeth contact the outer surface of this circular disk with their inner contact surfaces. However, advantageously as an extension, an eccentric ring is provided between the eccentric disk and the inner contact surfaces of the teeth. Here, the eccentric ring essentially executes a wobble movement without rotation, so that a drive of the teeth is enabled without a frictional connection of their inner contact surfaces to the eccentric ring. The teeth merely roll with slight roller friction on the eccentric ring, so that a higher efficiency is achieved.

To achieve a defined contact of the teeth to the drive element, these are advantageously biased in the radial direction. This can be realized in one method through biasing towards the rotational axis, which, e.g., is exerted by a biased elastic O-ring, e.g., a rubber ring. Here, the O-ring can surround axial projections or regions of the teeth, wherein it can also be set, e.g., through recesses of the teeth. Furthermore, biasing can be realized outwardly. This biasing can be realized, e.g., through a biased spring element, which sits on the shaft and presses the eccentric disk in a direction radially outwardly. Here, the spring element can be deformed purely elastically or mounted in the adjusting device under partial plastic deformation. Furthermore, radial biasing outwards is also possible, e.g., through an overdimension. However, in principle biasing is not required.

The rotational movement of the teeth can be initiated advantageously by a control surface at their radially inner reverse point acting as the bottom dead center. The control surface comes into contact with the inner contact surfaces of the teeth, when these are in their radially inner positions. In this way, in particular, a jamming effect of the teeth in the bottom dead center of their movement can be avoided. The control surface can be especially a control gearing region of a control gear wheel rotationally fixed to the second part or embodied integrally with this part. In particular, external gearing can be used as the control gearing. Here, the inner contact surface of a tooth comes into engagement with tooth gaps or recesses of the external gearing of the second part. Instead of external gearing, internal gearing can also be provided accordingly.

The tooth can, according to one embodiment, be turned about a rotational point defined on the first part, in that a tab of the tooth engages in a corresponding guide in the chamber between the webs of the other part. The guide tapers inwards in the radial direction on order to guarantee the defined rotational point at the radially inner position of the tooth and to enable both the inwardly directed, and also the outwardly directed circular arc path at the radially outer positions, in which the side surfaces of the teeth slide in a defined way on the side surfaces of the webs.

Alternatively, the teeth and webs can also have shoulder regions, which ensure the defined rotational movement for the sliding movement of the teeth on the webs.

Furthermore, here a control disk with a control surface creating a frictional connection with the inner contact surfaces of the teeth can also be provided, which is fixed, e.g., rotationally, to the input shaft or to the drive element.

The adjusting device according to the invention is robust and can transfer high torque forces with reliable self-locking and can guarantee precise position adjustment. Through the favorable transfer angle between the moved tooth and the internal gearing, a high efficiency can be achieved. Advantageously, a high gear reduction is achieved, so that the use of fast-running, small-sized, and cost-effective motors with small output torque is possible.

The adjusting device according to the invention is especially to be used for a adjusting round parts such as robotic round parts, in such a way as to realize a robotic hinge, in which preferably the motors and/or the adjusting devices in the round parts or the robotic arm parts can be used. More uses are the adjusting of a rope drum of a linkage, e.g., of a window-lift motor or a sunroof, in a clamping device to hold down a clamping arm, e.g., for keeping together of plates in welding and as a reduction gear unit in a motor or a nozzle.

BRIEF DESCRIPTION OF THE DRAWINGS

The invention is explained in more detail in the following with reference to the attached drawings using a few exemplary embodiments. Shown are.

DETAILED DESCRIPTION OF THE PREFERRED EMBODIMENTS

Figure 1:
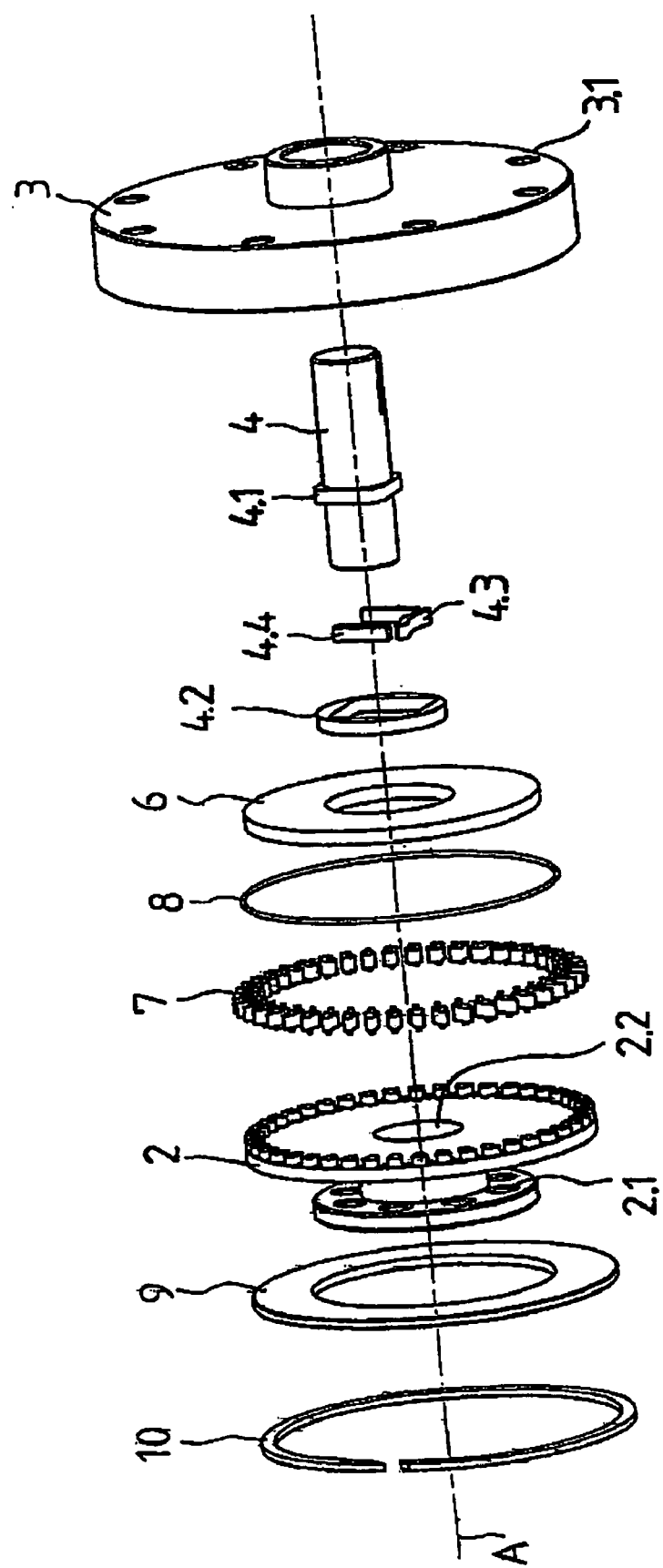
FIG. 1 an exploded view of an adjusting device according to an embodiment of the invention.

According to FIG. 1, as a first part an adjusting device 1 has a first flange part 2, which can be connected to another part of the whole device via attachment holes 2.1. The first flange part 2 has a center hole 2.2 and webs 2.3, which are spaced apart from each other in the peripheral direction, which project in the axial direction, and between which chambers 2.4 are defined. A second flange part 3 acting as a second part has attachment holes 3.1 for mounting on another part and internal gearing 3.2 with teeth 3.3 and recesses 3.4 formed between the teeth 3.3. An input shaft 4 has a square region 4.1, in which, on two opposing sides, spacing holders 4.4 are set and on another side an elastic (possibly also with additional plastic biasing), tensioned biasing spring element 4.3 is set. A circular disk 4.2 with square center hole 4.5 is set on the spacing holders 4.4 and the biasing spring element 4.3 and is used in its eccentric position as an eccentric disk 4.2. The spacing holders 4.4 glide on the square region 4.1 and/or on the eccentric disk 4.2.

An eccentric ring 6 is set around the eccentric disk 4.2 and executes a wobble movement when the input shaft 4 rotates. Teeth 7 are distributed in the peripheral direction such that with their inner contact surfaces 7.4 they contact the eccentric ring 6 and extend away from the rotational axis A. Outer contact surfaces 7.5 of the teeth 7 engage in the internal gearing 3.2 of the second part 3 when the input shaft 4 rotates. Through the biasing of the biasing spring element 4.3, the teeth are pressed into the internal gearing 3.2. An O-ring 8 is set with biasing around axially extending projections 7.1 of the teeth 7 and creates a contact between each tooth 7 with its inner contact surface 7.4 and the outer side of the eccentric ring 6. In principle, the biasing by the O-ring 8 or by the biasing spring element 4.3 (and the projections 7.1) can be eliminated, because one of the two biasing means is sufficient. A biasing ring 10 is used for pressing the parts in the axial direction.

Figure 2:
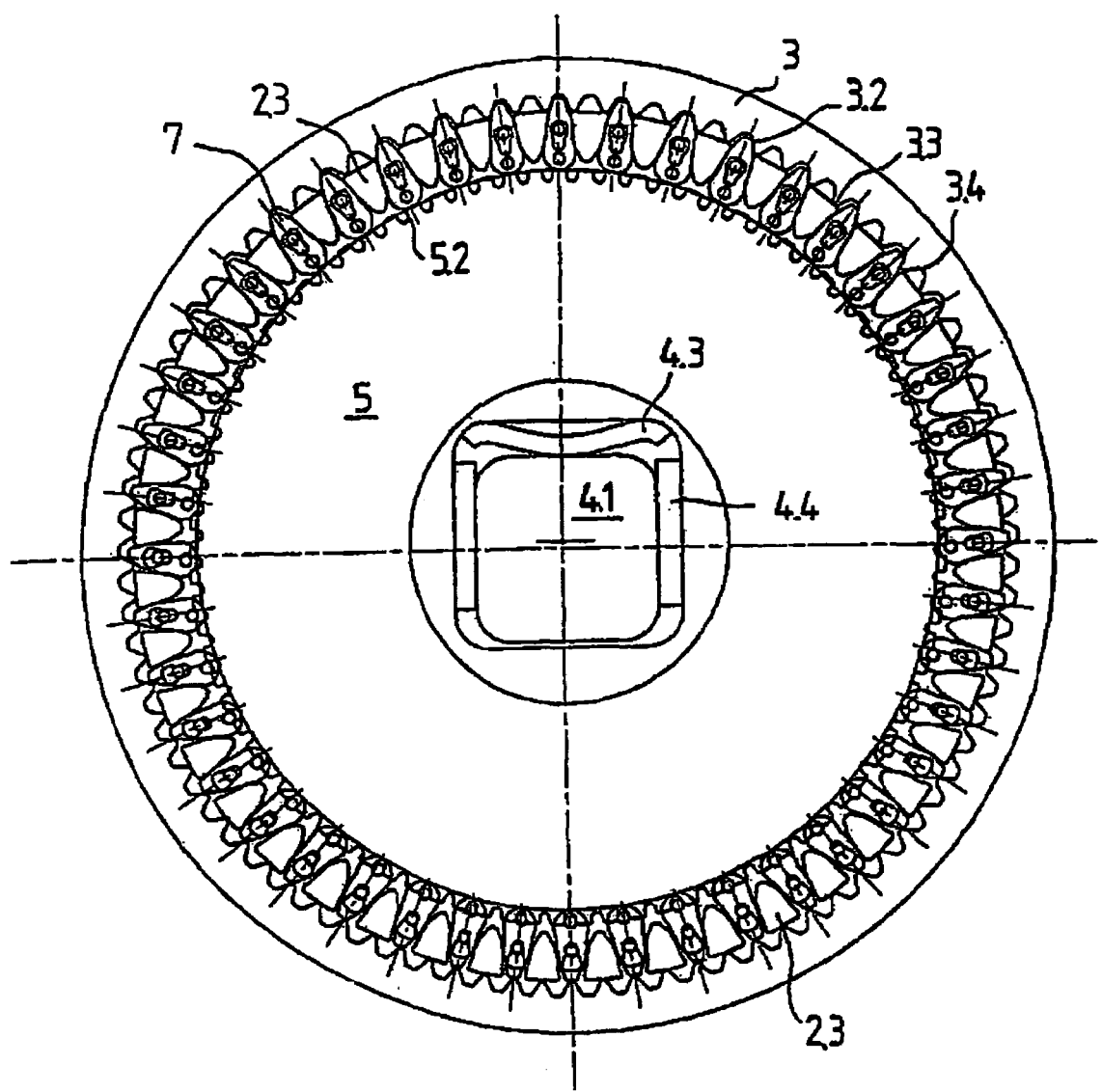
FIG. 2 a cross section of the adjusting device according to FIG. 1.
Figure 3:
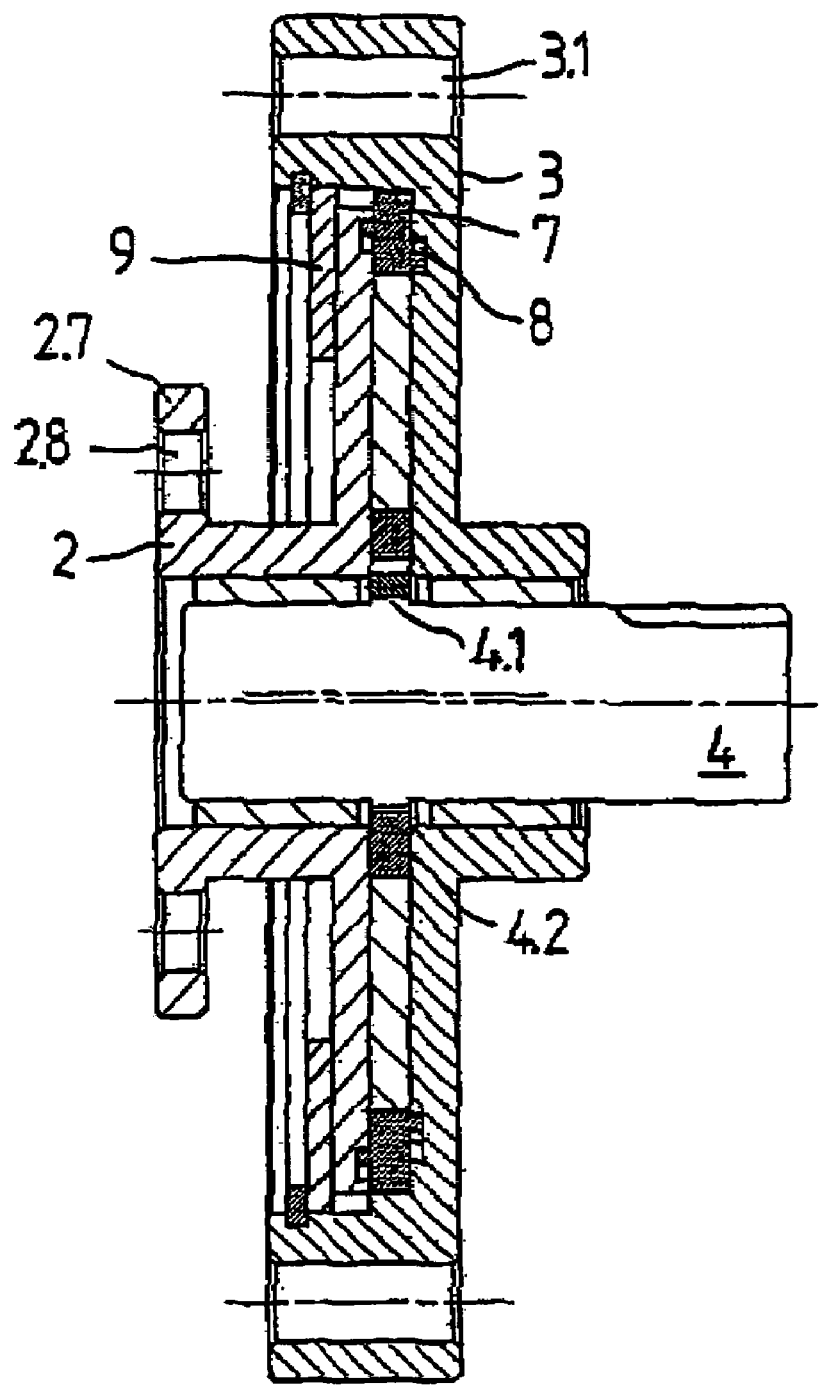
FIG. 3 a longitudinal section of the adjusting device according to FIG. 1.
Figure 4:
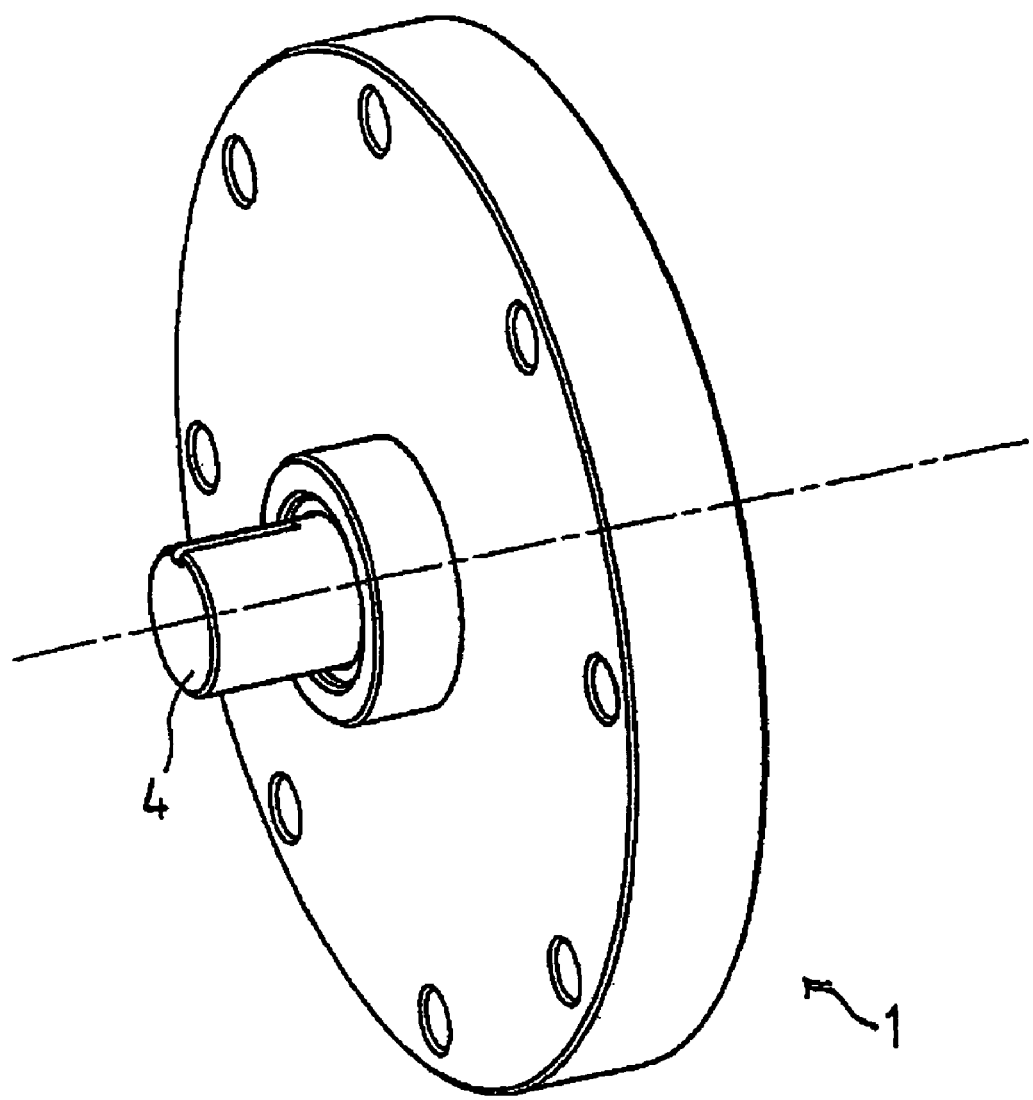
FIG. 4 a perspective view of the assembled adjusting device.
Figure 5:
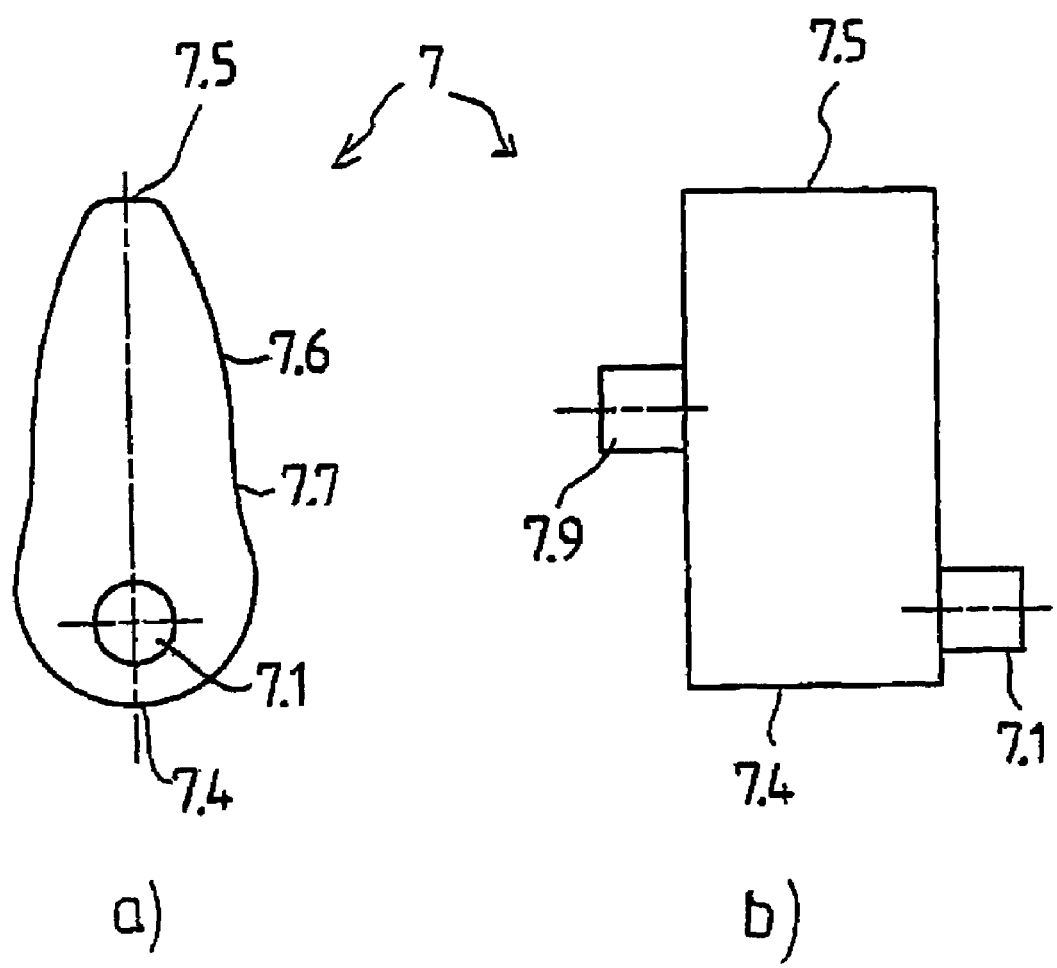
FIGS. 5a, b a front view and side view of a tooth according to the invention used in the adjusting device.
Figure 6:
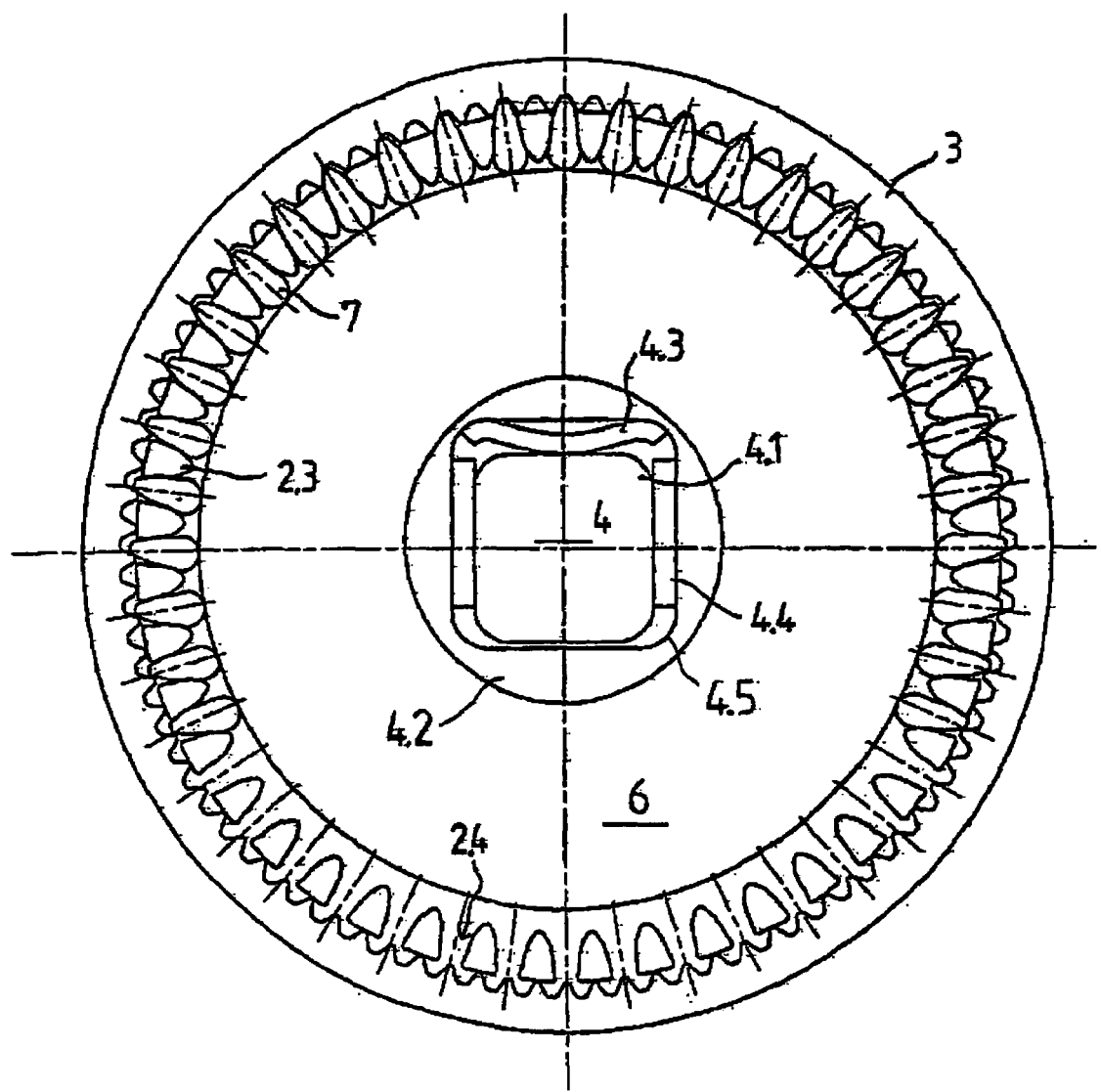
FIG. 6 a cross section with illustration especially of the teeth engaging in the internal gearing.
Figure 7:
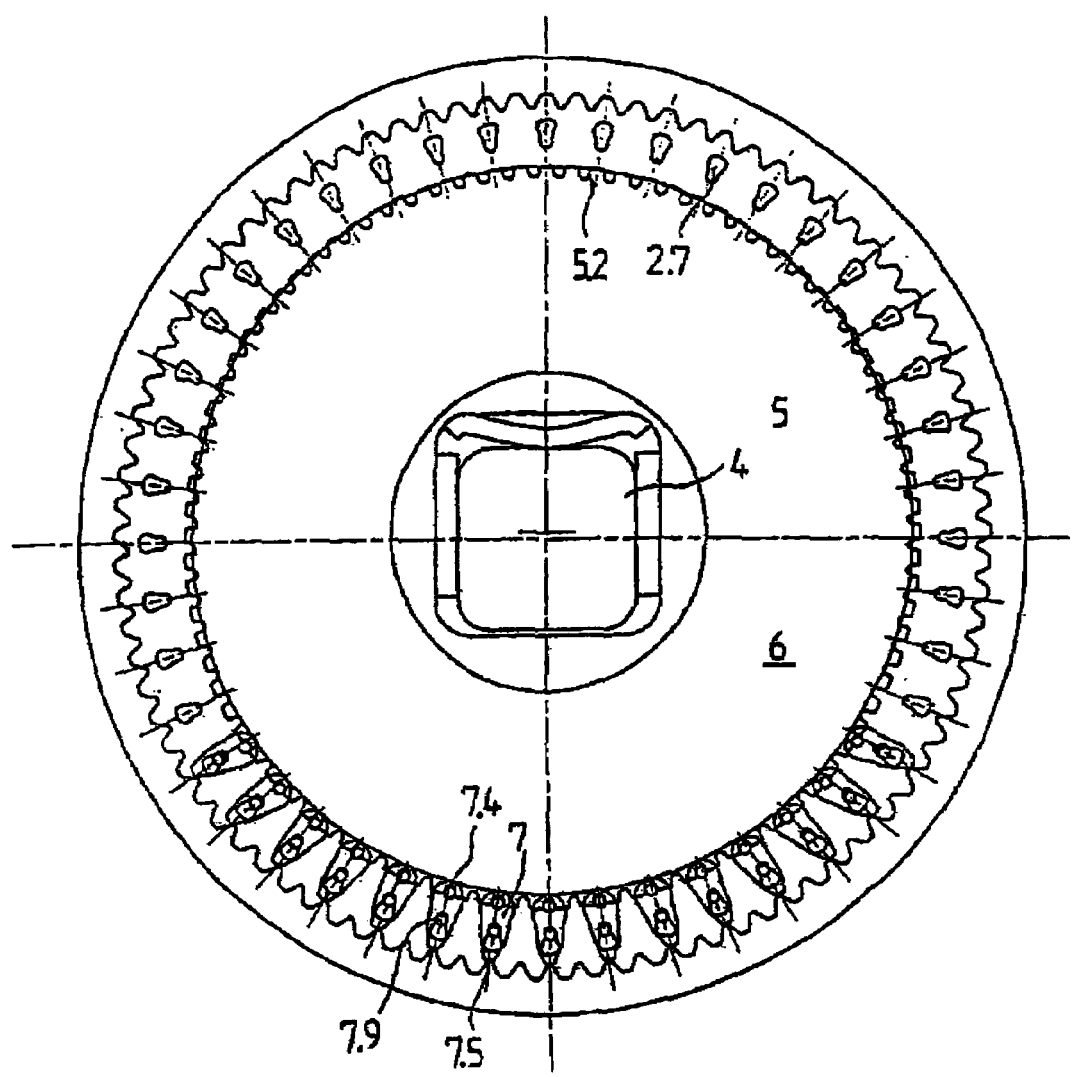
FIG. 7 a cross section or superimposed view, especially of the teeth engaging in the external gearing.
Figure 8:
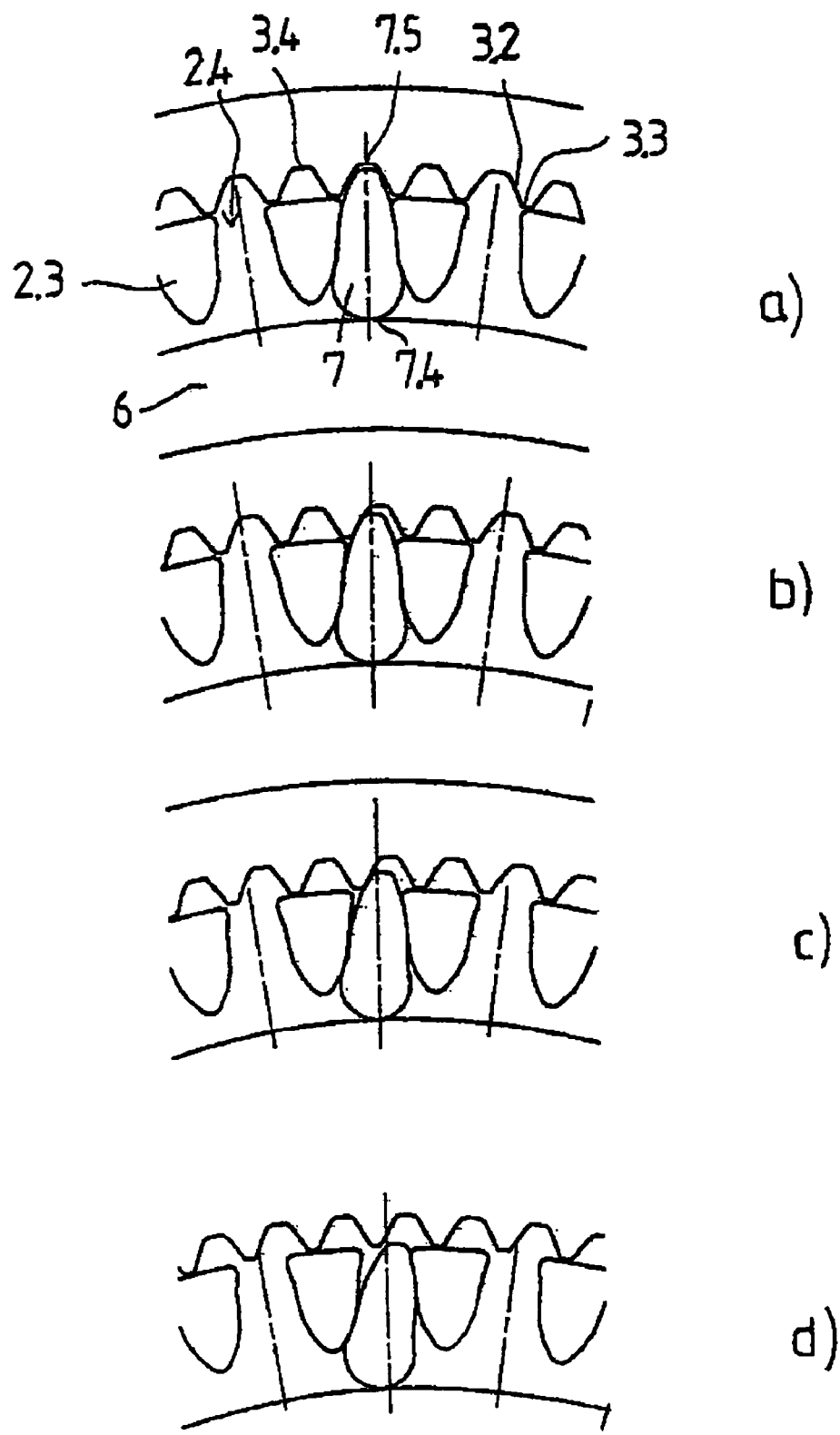
FIGS. 8a-d the representation of the movement of a tooth between adjacent webs.
Figure 9:
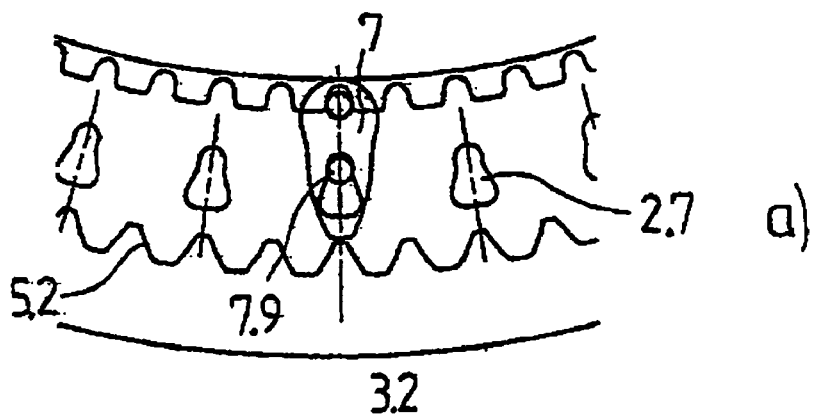
FIGS. 9a-d the representation of the movement of a tooth between the internal and external gearing.
Figure 9:
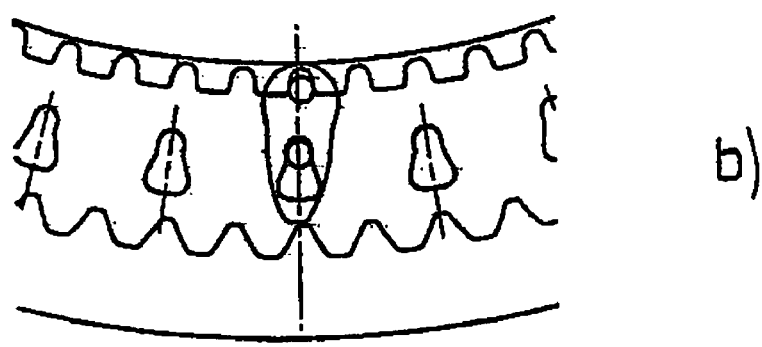
Figure 9:
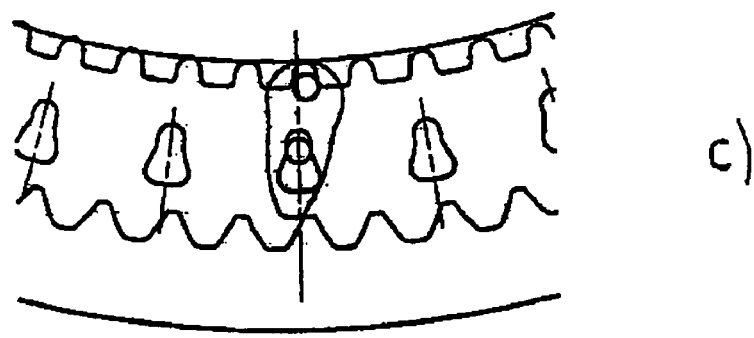
Figure 9:
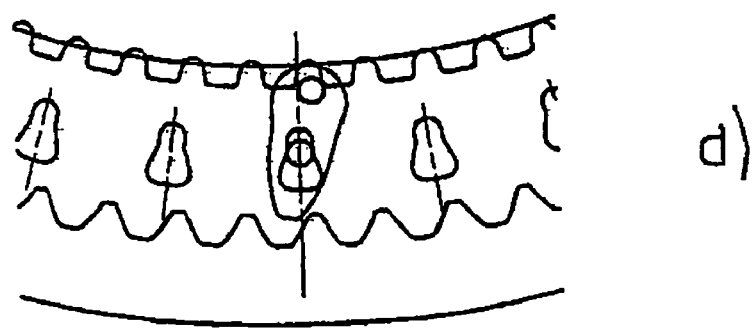
Figure 10:
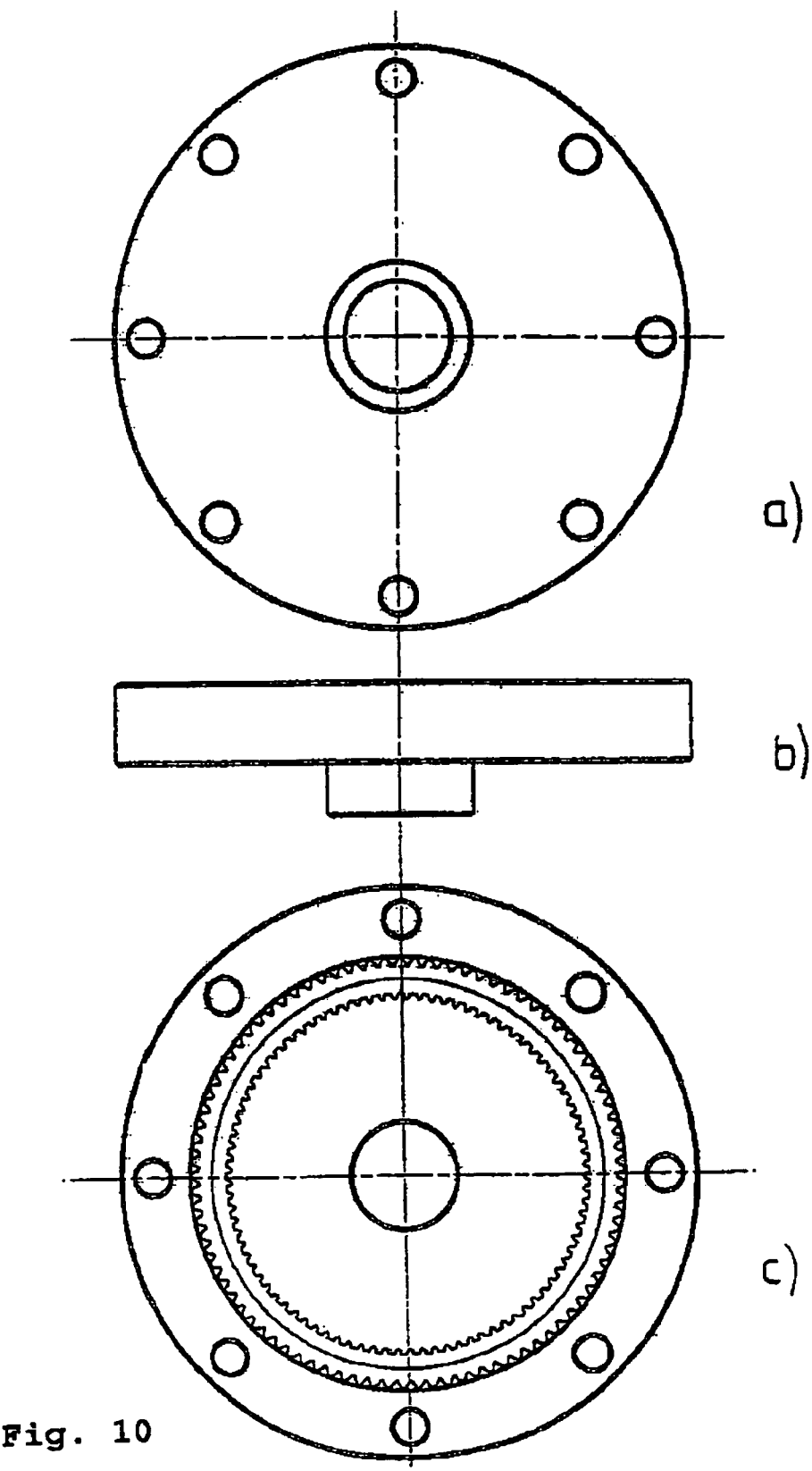
FIGS. 10a-c front, side, and rear views of the second part.
Figure 11:
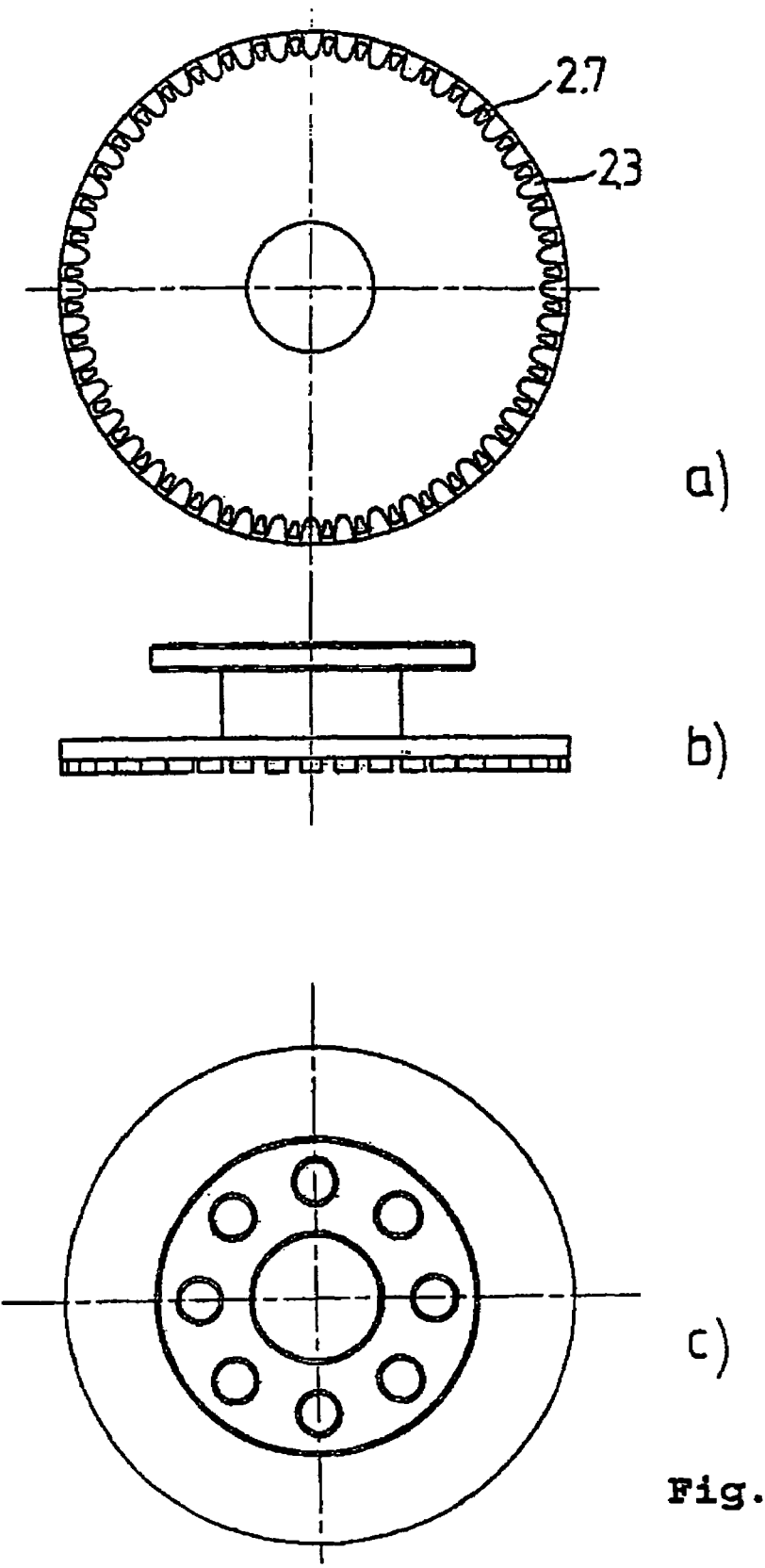
FIGS. 11a-c front, side, and rear views of the first part.

The guidance of the teeth 7 in the chambers 2.4 between the webs 2.3 can be seen especially in FIG. 2 and FIGS. 8 and 9, because the teeth 7 are in various successive engagement positions for the rotating eccentric disk 4.2. The lowermost tooth 7 in FIG. 2 is in the innermost position in the radial direction, at which it contacts the apex point of a tooth 3.3 of the internal gearing 3.2 with its outer contact surface 7.5. Here, the tooth 7 extends precisely in the radial direction. The uppermost tooth 7 in FIG. 2 is in its outermost position in the radial direction, at which it is in engagement with a recess 3.4 (tooth gap) of the internal gearing 3.2. Torque is applied to this tooth 7, as well as the other teeth approximately in the bottom half shown in FIG. 7, through the external gearing 5.2, which creates a defined tipping of the tooth in the innermost position acting as the bottom dead center of the inwards and outwards movement of the teeth. Between the innermost and outermost positions, the teeth 7 move on circular arc paths. The teeth 7 taper according to FIG. 5 from the inner contact surface 7.4 to the outer contact surface 7.5, which can be embodied flat or also curved as shown. Side surface 7.6 of the teeth advantageously have concave side surface regions 7.7. The teeth 7 glide according to FIG. 8 with their side surfaces 7.6 essentially with the concave side surface region 7.7 on the webs 2.3. The webs 2.3 taper towards the rotational axis A, are formed essentially with a triangular or wedge shape, and likewise advantageously have concave side surface regions 2.6.

In the chambers 2.4, additional guides 2.7 are formed as recesses, in which axially projecting tabs 7.9 of the teeth 17 engage. The tabs 7.9 are arranged approximately in the center of the teeth 7 and extend in the axial direction opposite to the projections 7.1 arranged at the bottom end of the teeth 7. The guides 2.7 taper towards the rotational axis A, so that the tabs 7.9 are held in the innermost position of the teeth 7 essentially play-free and form a defined rotational point for the teeth 7. The circular arc-shaped outwards and inwards movements of the teeth 7 are enabled by the expansion of the guides 7.7 outwards.

The external gear wheel 5 is embodied rotationally fixed or integrally with the second flange part 3. In the representations of FIGS. 2 and 7, the external gearing region 5.2 of the external gear wheel 5 with teeth 5.3 and recesses 5.4 (tooth gaps) formed in-between is used as a control surface. The number of tooth gaps 5.4 of the external gearing 5 can be, e.g., higher by one than the number of teeth 7 and the number of teeth 7 in turn can be equal to the number of webs 12.3 and less by one than the number of teeth 3.3 of the internal gearing 3.2 of the second flange part 3. The inner contact surfaces 7.4 of the teeth 7 come in contact with side faces of the teeth 5.3 of the external gear wheel 5 near their radially inner position, i.e., at the bottom teeth of FIG. 2 or the teeth 7 shown in FIG. 7.

Through the positive-fit holding of the inner contact surfaces 7.4 of the teeth 7 on the external gear wheel 5, a defined rotation of the teeth 7 at its innermost position corresponding to a bottom dead center is achieved; alternatively, a frictional-connection contact of the teeth 7 on a control disk fixed rotationally, e.g., to the input shaft 4, is also possible. This results in a continuous support of the teeth 7 on the eccentric ring 6, which acts as a drive element and through which a functional separation of the driving effect and the control surface creating the rotation or tipping of the teeth is achieved.

Figure 12:
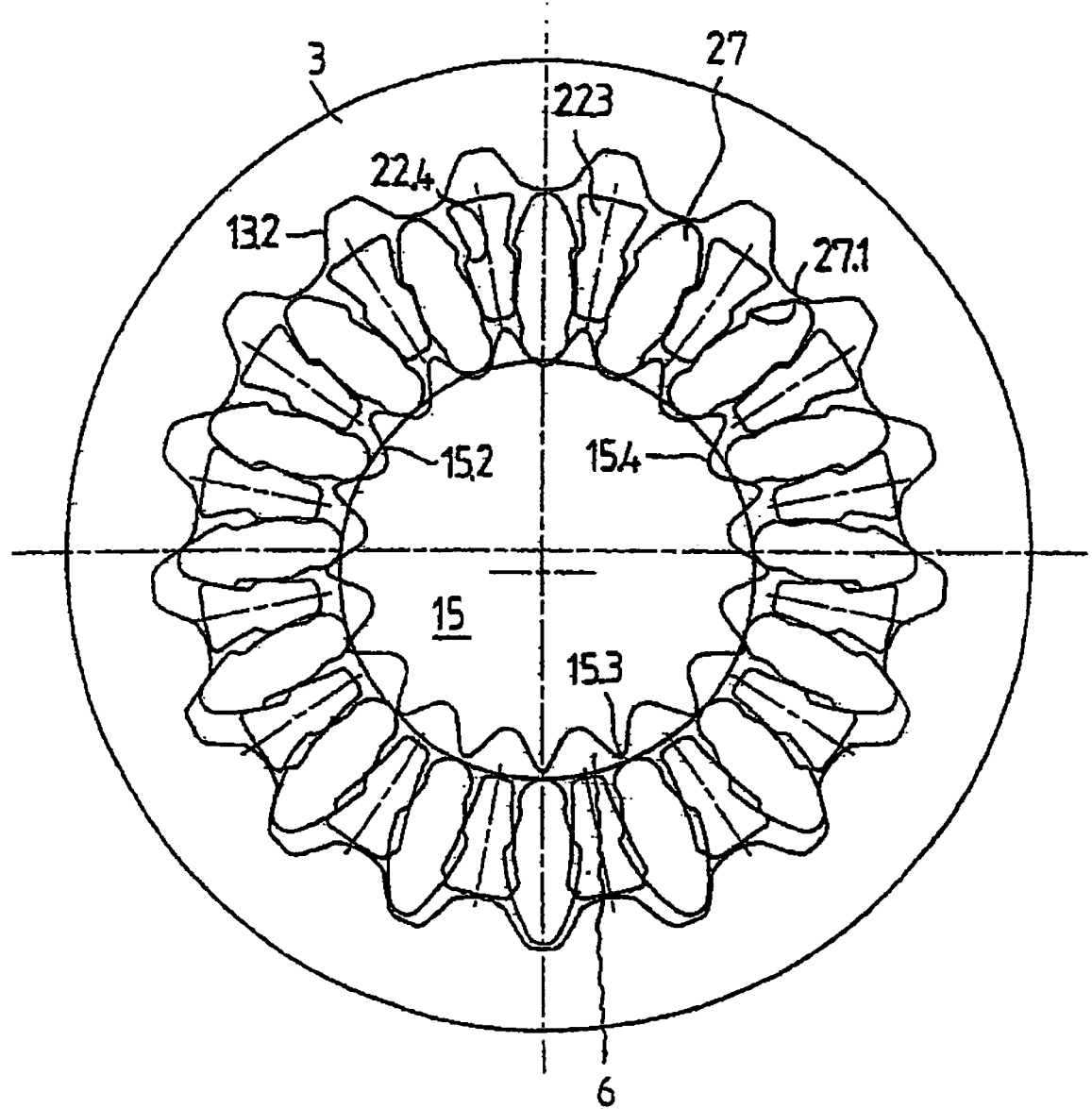
FIG. 12 a cross section of an adjusting device according to a further embodiment.

For the embodiment shown in FIG. 12, essential parts correspond to those of the first embodiment and therefore are not described in more detail. The adjusting device has teeth 27 with lateral shoulder regions 27.1 and webs 22.3 with lateral shoulder regions 22.4, which come into contact with each other in the gliding movement of the teeth 27. Through the shaping with the shoulder regions, the movement of the teeth can be defined sufficiently, so that in contrast with the embodiment of FIGS. 1 to 11, the slot-peg guide can be eliminated. Thus, the entire guide and force transfer occurs in a plane, e.g., tipping moments acting on the teeth out of the plane can be prevented. Also for this embodiment, an external gear wheel 15 is provided as a control gear wheel. This external gear wheel engages the bottom regions of the teeth 27 with its external gearing 15.2.

According to the invention, the external gear wheel 5 or 15 can also be decoupled from the driven shaft and supported, e.g., so that it rotates freely. For such an arrangement, the teeth 7 or 27 drive the freely rotating external gear wheel 5 for its inwards movement and are turned by the external gear wheel.

The invention claimed is:

1. Adjusting device for adjusting two parts relative to one another, other than for a device for adjusting the valve timing of a camshaft, and the adjusting device further comprises an input shaft (4), an eccentric drive element (4.2, 6) that can be driven by the input shaft, a first part (2) with webs (2.3, 22.3), which are spaced apart in a peripheral direction and between which chambers (2.4) are formed, a second part (3) with internal gearing (3.2, 13.2), and several teeth (7, 27), which are arranged in the chambers (2.4) spaced apart from each other in the peripheral direction, each having an inner contact surface (7.4) for contact with a drive element (6) and an outer contact surface (7.5) for engagement in the internal gearing (3.2, 13.2) and which are adjustable in a radial direction when the input shaft (4) rotates, wherein when the input shaft (4) rotates, the parts (2, 3) can rotate relative to each other in a self-locking manner under engagement of the teeth (7, 27) in the webs (22.3) and in the internal gearing (3.2), wherein when the input shaft (4) rotates, the teeth (7, 27) in the chambers (2.4) can execute rotational movements about rotational axes parallel to a rotational axis (A) of the parts (2, 3).

2. Adjusting device according to claim 1, wherein when the input shaft (4) rotates, each of the teeth (7, 27) can be guided on a first circular-arc path radially inwardly and then on a second circular-arc path radially outwardly.

3. Adjusting device according to claim 1, wherein a control surface (5.2) is provided for engagement in the teeth (7, 27), wherein torque can be exerted on the teeth (7) by the control surface (5.2) for executing the rotational movements.

4. Adjusting device according to claim 3, wherein the teeth (7, 27) are supported radially inwardly by the drive element (6) and the control surface (5.2) is led into engagement with an inner contact surface (7.4) of one of the teeth (7, 27) only in radially inner positions of the tooth (7, 27).

5. Adjusting device according to claim 3, wherein the control surface is a control gearing region (5.2, 15.2) of a control gear wheel (5, 15), preferably an external gear wheel.

6. Adjusting device according to claim 5, wherein the control gearing region is an external gearing region (5.2, 15.2) of an external gear wheel (5, 15) rotationally fixed to the second part (13).

7. Adjusting device according to claim 5, wherein the control gear wheel (5, 15) is supported so that it can rotate freely about the rotational axis (A) of the parts.

8. Adjusting device according to claim 1, wherein an axially projecting tab (7.9), which is held in a guide (2.7) of the first part (2), is formed on the tooth (7, 27).

9. Adjusting device according to claim 8, wherein the guide is a recess (2.7) formed in the first part (2) between the webs (22.3).

10. Adjusting device according to claim 8, wherein the guide (2.7) tapers towards the rotational axis.

11. Adjusting device according to claim 10, wherein the tooth (7, 27) can rotate in a radially inner position about a rotational axis defined by the tab (7.9).

12. Adjusting device according to claim 1, wherein on side surfaces of the teeth and the webs acting as sliding surfaces, the teeth (27) and the webs (22) have shoulder regions (22.4, 27.1), which are led into contact with each other.

13. Adjusting device according to claim 1, wherein the webs (2.3, 22.3) taper towards the rotational axis.

14. Adjusting device according to claim 1, wherein the control surface (15.2, 5.2) is formed on a control disk (5, 15), which can rotate via the input shaft (4), preferably with frictional connection between the control surface (5.2, 15.2) and the radially inner contact surfaces (7.4) of the teeth in radially inner positions thereof.

15. Adjusting device according to claim 14, wherein the control disk (5) is led into engagement with the inner contact surfaces (7.4) of the teeth (7, 27) only in the control surface (5.2).

16. Adjusting device according to claim 14, wherein the control disk (6) is fixed rigidly on the drive shaft (4), preferably by a locking tab of the drive shaft (4), which is guided by a locking recess of the control disk (5).

17. Adjusting device according to claim 1, wherein the webs (2.3, 22.3) have in a radially center region (2.6) a taper with concave side surfaces (2.5).

18. Adjusting device according to claim 1, wherein the teeth (7,27) each have a center region (7.6) connecting the regions (7.2, 7.3) to at least partially concave side surfaces (7.7) between a radially inner region (7.2), which has the outer contact surface (7.5), for sliding and/or rolling contact on the webs (2.4).

19. Adjusting device according to claim 1, wherein the drive element is an eccentric disk (4.2) of the input shaft (4).

20. Adjusting device according to claim 19, wherein the eccentric ring (6) executes a wobble movement, preferably essentially without rotation, wherein the inner contact surfaces of the teeth (7, 27) roll on the eccentric ring (6).

21. Car seat including an adjusting device according to claim 1, wherein the teeth (7, 17, 27) are biased in the radial direction.

22. Car seat including an adjusting device according to claim 21, wherein the teeth (7, 17, 27) are biased towards the rotational axis and have axially extending projections (7, 1, 17.1) or regions, around which is set an elastic ring (8, 18) biased towards the rotational axis.

23. Car seat including an adjusting device according to claim 21, wherein the teeth (7, 17, 27) are biased towards the rotational axis and have axially extending projections (7,1, 17.1) or regions, around which is set an elastic ring (8, 18) biased towards the rotational axis.

24. Car seat including an adjusting device according to claim 23, wherein the biasing spring element (4.3) is mounted through at least partial plastic deformation between the input shaft (4) and the eccentric disk (4.2, 14.2).

* * * * *